US009494141B2

(12) United States Patent
Conte et al.

(10) Patent No.: US 9,494,141 B2
(45) Date of Patent: Nov. 15, 2016

(54) SOLAR THERMAL POWER SYSTEM

(71) Applicant: ALSTOM Technology Ltd, Baden (CH)

(72) Inventors: Enrico Conte, Schliern b. Könlz (CH); Nicolas Marchal, Zürich (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 14/155,845

(22) Filed: Jan. 15, 2014

(65) Prior Publication Data

US 2015/0226187 A1 Aug. 13, 2015

(30) Foreign Application Priority Data

Jan. 16, 2013 (EP) .................................... 13151511

(51) Int. Cl.
*F03G 6/06* (2006.01)
*F01K 15/00* (2006.01)
*F03G 6/00* (2006.01)
(Continued)

(52) U.S. Cl.
CPC ............... *F03G 6/067* (2013.01); *F01K 3/02* (2013.01); *F01K 15/00* (2013.01); *F01K 19/00* (2013.01); *F03G 6/005* (2013.01); *Y02E 10/46* (2013.01)

(58) Field of Classification Search
CPC ............ F03G 6/00; F03G 6/003; F03G 6/06; F03G 6/064; F03G 6/065; F03G 6/067; F03G 6/005; F03G 2006/061; F03G 2006/008; Y02E 10/40–10/46
USPC ........... 60/641.8–641.15, 653, 676, 679, 680
See application file for complete search history.

(56) References Cited

U.S. PATENT DOCUMENTS

2008/0034757 A1   2/2008   Skowronski et al.
2011/0277469 A1   11/2011  Brenmiller et al.
(Continued)

FOREIGN PATENT DOCUMENTS

CN   201190639 Y   2/2009
EP   1 820 964      8/2007
(Continued)

OTHER PUBLICATIONS

Office action issued from Chinese Patent Office dated Dec. 21, 2015 for CN Application No. 201410019199.2.

*Primary Examiner* — Thomas Denion
*Assistant Examiner* — Mickey France
(74) *Attorney, Agent, or Firm* — Dority & Manning, P.A.

(57) ABSTRACT

A solar thermal power system includes a solar receiver and a thermal energy storage arrangement including thermal energy storage fluid to be circulated through the solar receiver to store thermal energy. The system includes a multistage steam turbine operable on variable pressure steam generated by primary and secondary arrangements, by utilizing the fluid. The primary arrangement generates and supplies a high pressure steam to a high pressure turbine inlet, and exits from a high pressure turbine outlet. The secondary arrangement having a reheat assembly, to generate an intermediate pressure steam from the fluid, received from the storage arrangement through the reheat assembly. The intermediate pressure steam and released steam from a high pressure turbine outlet are mixed and reheated in the reheat assembly to be supplied to an intermediate pressure turbine inlet.

11 Claims, 3 Drawing Sheets

(51) Int. Cl.
*F01K 3/02* (2006.01)
*F01K 19/00* (2006.01)

(56) References Cited

U.S. PATENT DOCUMENTS

2013/0019599 A1* 1/2013 Birnbaum ............... F03G 6/067
 60/641.15

2014/0165572 A1* 6/2014 Pang ...................... F02C 7/224
 60/736

FOREIGN PATENT DOCUMENTS

WO WO 2011124408 A2 * 10/2011 ............. F03G 6/067
WO 2011140021 A1 11/2011

* cited by examiner

SOLAR THERMAL POWER SYSTEM

CROSS-REFERENCE TO RELATED APPLICATIONS

This application claims priority to European application 13151511.6 filed Jan. 16, 2013, the contents of which are hereby incorporated in its entirety.

TECHNICAL FIELD

The present disclosure generally relates to the field of concentrated solar power, and more particularly, to a concentrated solar thermal power plant with molten salt heat storage that utilizes concentrated solar power to store heat energy, and utilize the stored heat energy to generate electricity.

BACKGROUND

A solar thermal power plant based on Direct Steam Central Receiver (DSCR) includes a large field of heliostats and a solar receiver placed on a tower of substantial height. The heliostats focus direct sunlight on to the solar receiver to produce steam to be utilized to run a steam turbine from producing electricity. Typically, the solar thermal power plant operates on a daily cycle, during clear sunlight hours, while shutting down in nights or in cloudy seasons. However, if the solar thermal power plant is to meet increasing electricity demand, it needs to be operable irrespective of the availability of solar light, i.e. in nights or in cloudy seasons. A realization of such a solar thermal power plant generates a requirement of storing solar thermal energy during day times and utilizing thereto in nights or in cloudy seasons. For such requirement, a central receiver including a solar energy storage fluid, such as molten salt, is generally used. The central receiver with molten salt is generally known as Molten Salt Central Receiver (MSCR).

A typical MSCR system 10 is evident in FIG. 1. The MSCR system 10 includes a MSCR 12, hot and cold storage tanks 14, 16 and a Molten Salt Steam Generator (MSSG) cycle 18. The molten salt fluid heated at the MSCR 12 is stored in the hot storage tank 14, at temperature of about 565° C., and after thermal energy thereof is being utilized by the MSSG cycle 18, it is stored in the cold storage tank 16, at temperature of about 290° C., from where it is further sent to the MSCR 12 to be reheated. The MSSG cycle 18 includes a steam generator arrangement 20, a reheat 22 and a turbine 24. The steam generator arrangement 20 utilizes the heat of the hot molten salt and converts feed water from a feed water tank 26 in to steam and send it to a high pressure turbine inlet of the turbine 24 for the conversion of heat to electricity through a generator 'G'. Further, the steam from a high pressure turbine outlet of the turbine 24 is reheated by the reheat 20 by utilizing the hot molten salt. This reheated steam is supplied to an intermediate pressure turbine inlet of the turbine 24 for the conversion of heat to electricity.

Temperature and pressure of steam in the MSSG cycle 18 are generally limited, respectively, by the hot molten salt temperature, typically at 545° C., and by a pinch limitation in the MSSG cycle 18, typically at or lower to 115 bars. The pinch limitation in MSSG cycle 18 is dependent on the two important factors. Firstly, feed water temperature for being converted into steam shall need to be maintained above 240° C. to avoid freezing of the molten salt. Secondly, after the steam from a high pressure turbine outlet of the turbine 24 is reheated by the reheat 20 by utilizing the hot molten salt, the temperature of such used hot molten salt is still above the temperature at which it can be sent to the cold storage tank 14, i.e. above 290° C. A possible solution to avoid sending such hot molten salt from the reheat 20 is to mix it at any stage of the steam generator arrangement 20, i.e., between any of the two of economizer, superheater and evaporator. Due to these two pinch limitation requirement, low steam pressure is resulted as mentioned, which has various negative impact on the efficiency of the solar thermal power plant, including but not limited to, lower efficiency of the power plant, formation of cold spots/stagnation in-turn resulting freezing of molten salt, plugging and damage of heat exchange of the steam generator arrangement 20.

It is not that sufficient efforts have not been taken till date to resolve these pinch limitation requirement. One particular effort may be evident in FIG. 2, where the reheat 20, as shown in FIG. 1, has been removed, eliminating the need of reheating the steam that exits from the high pressure turbine outlet of the turbine 24. Such arrangement may avoid mixing of still hot molten salt at any stage of the steam generator arrangement 20, thereby precluding the requirement of pinch limitation. However, in this case the steam pressure provided at a high pressure turbine inlet of the turbine 24 should be increased enough to compensate for the efficiency lost by not carrying out the reheat. But due to low steam pressure, such arrangement may incur in very high wetness at an exit of the low pressure steam turbine, with a negative impact on efficiency and erosion of last stage blades.

SUMMARY

The present disclosure discloses a solar thermal power system that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a solar thermal power system that may be capable of being operative on pinch limitation free variable, particularly, the pinch limitation variable of having need of mixing hot molten salt released from the reheat to the high pressure line in order, and still able to obtain sufficient pressure steam to be send to intermediate pressure stage turbine to increase overall efficiency of such plant.

Another object of the present disclosure is to disclose a solar thermal power system that may be capable of precluding wetness problem at an exit of the low pressure steam turbine.

In one aspect of the present disclosure, a solar thermal power system is described to achieve one or more objects of the present disclosure. A solar thermal power system includes a solar receiver, a thermal energy storage arrangement, a multistage steam turbine, and primary and secondary steam generator arrangements. The thermal energy storage arrangement includes a thermal energy storage fluid to be circulated through the solar receiver to store thermal energy. Further, the multistage steam turbine is operable on a variable pressure steam generated by the thermal energy storage fluid for driving an electrical generator to produce electrical power. The multistage steam turbine is operable on the variable pressure steam generated by the primary and secondary steam generator arrangements. The primary steam generator arrangement is utilized to supply a high pressure steam of a desired pressure, produced from the thermal energy storage fluid, to a high pressure turbine inlet of the multistage steam turbine. The steam exits from a turbine stage downstream of a high pressure turbine outlet. Further, the secondary steam generator arrangement having a reheat assembly is adapted to generate an intermediate pressure steam, produced from the thermal energy storage fluid received from the thermal energy storage arrangement through the reheat assembly. The intermediate pressure steam and the steam that exits from the turbine stage downstream of the high pressure turbine outlet, both, are being mixed and supplied to the reheat assembly to be reheated and then supplied to an intermediate pressure turbine inlet of the multistage steam turbine.

In one embodiment of the present disclosure, the thermal energy storage arrangement of the solar thermal power system includes first and second storage tanks. The first storage tank is adapted to store the hot thermal energy storage fluid. The second storage tank is adapted to store the cold thermal energy storage fluid. The thermal energy storage arrangement supplies the cold thermal energy storage fluid from the second storage tank to the solar receiver to be reheated.

In one embodiment, the primary steam generator arrangement is adapted to receive the hot thermal energy storage fluid from the first storage tank to generate the high pressure steam of the desired pressure to be supplied to the high pressure turbine inlet of the multistage steam turbine. Hot thermal energy storage fluid results in cold thermal energy storage fluid upon its heat being utilized by the primary steam generator arrangement to generate the high pressure steam. This resultant cold thermal energy storage fluid is being directly supplied to the second storage tank from the primary steam generator arrangement. In one exemplary form, the primary steam generator arrangement may include a high pressure economizer, a high pressure evaporator and a superheater communicably configured to utilize the heat of the hot thermal energy storage fluid received from the first storage tank to generate the high pressure steam of the desired pressure.

In one embodiment, the secondary steam generator arrangement is adapted to receive the hot thermal energy storage fluid from the first storage tank through the reheat assembly to generate an intermediate pressure steam. The hot thermal energy storage fluid results in cold thermal energy storage fluid upon its heat being utilized by the secondary steam generator arrangement to generate the intermediate pressure steam. This resultant cold thermal energy storage fluid is being directly supplied to the second storage tank from the secondary steam generator arrangement. In one exemplary form, the secondary steam generator arrangement may also include an intermediate pressure economizer, an intermediate pressure evaporator and a superheater communicably configured to utilize the heat of the hot thermal energy storage fluid received from the first storage tank through the reheat assembly to generate the intermediate pressure steam.

In one embodiment, the steam from an intermediate pressure turbine outlet is supplied to a low pressure turbine inlet of the multistage steam turbine.

In one embodiment, the solar thermal power system may further include a conditioning arrangement for conditioning the steam exiting from the multistage steam turbine. The conditioning arrangement includes a condenser, low and high pressure heater arrangements and a feed-water supply. The condenser is adapted to condense the steam exiting from the multistage turbine to obtain water. Further, the low and high pressure heater arrangements are configured to heat the water received from the condenser. Furthermore, the feed-water supply is configured to supply high pressure feed-water to the primary and secondary steam generator arrangements.

The primary and secondary steam generator arrangements preclude the need of mixing hot molten salt releases from the reheat in order to obtain high pressure or desired pressure live steam to increase overall efficiency of such plant. Such primary and secondary steam generator arrangements may also enable the solar thermal power system to be operable on at least pinch limitation free variable. Further, due to reheating of the steam, by the reheat assembly, which exits from the turbine stage downstream of the high pressure turbine outlet for supplying thereto to the intermediate pressure turbine inlet, precludes wetness problem at an exit of the low pressure steam turbine.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "primary," "secondary," "first," "second" and the like, herein do not denote any order, elevation or importance, but rather are used to distinguish one element from another. Further, the terms "a," "an," and "plurality" herein do not denote a limitation of quantity, but rather denote the presence of at least one of the referenced item.

Figure 1:
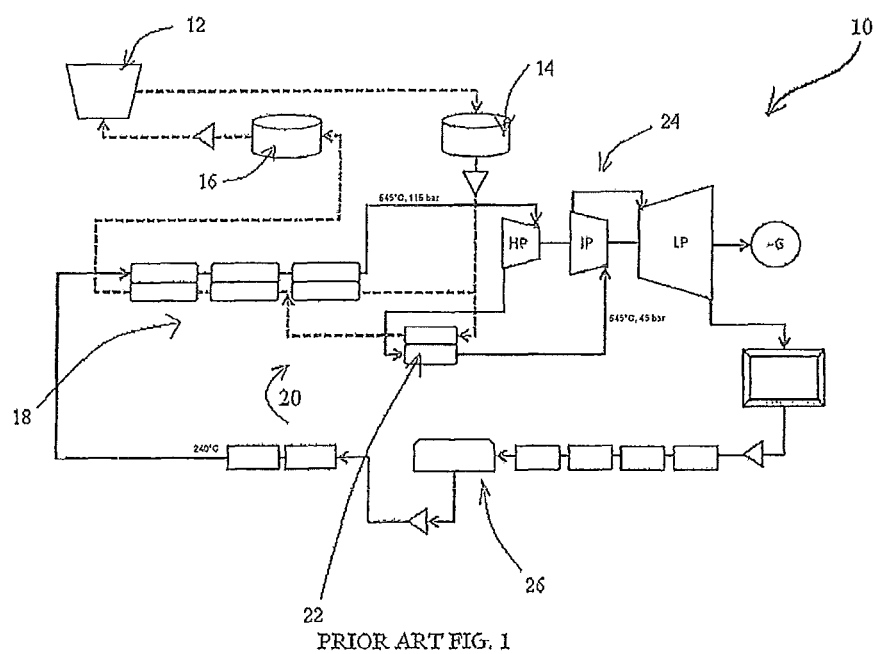
FIG. 1 is a diagrammatic illustration of a known solar thermal power system.
Figure 2:
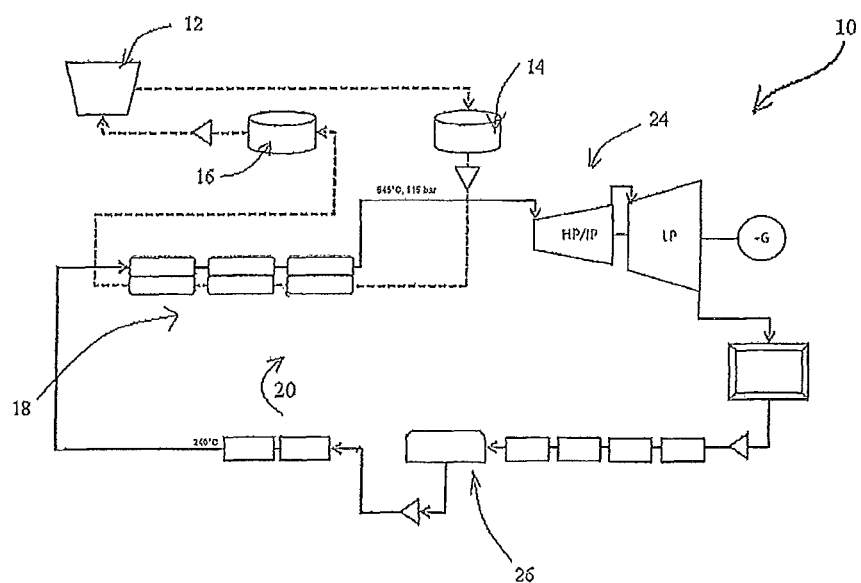
FIG. 2 is a diagrammatic illustration of another known solar thermal power system.
Figure 3:
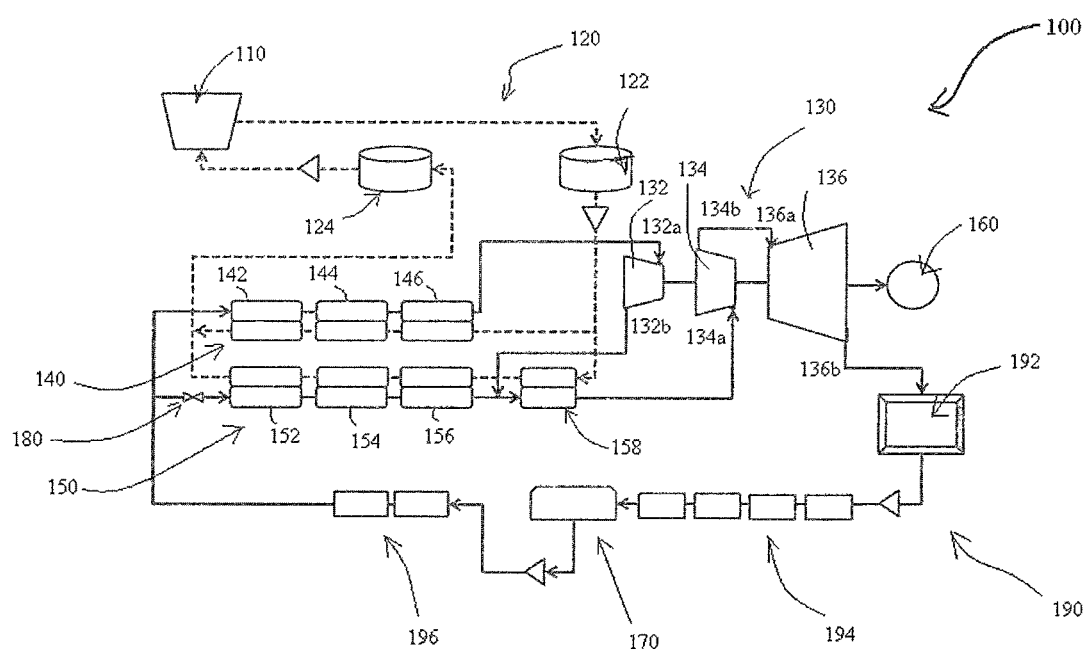
FIG. 3 is a diagrammatic illustration of a solar thermal power system, in accordance with an exemplary embodiment of the present disclosure.

Referring to FIG. 3, an example diagrammatic illustration of a solar thermal power system 100 is illustrated in accordance with an exemplary embodiment of the present disclosure. A solar thermal power system 100 (hereinafter referred to as 'system 100') includes a solar receiver 110 that may be placed on a tower of substantial height and surrounded by a large field of heliostats. The solar receiver 110 receives solar energy from the heliostats to be heated. The system 100 further includes a thermal energy storage arrangement 120 (hereinafter referred to as 'thermal storage arrangement 120') (dotted lines) having a thermal energy storage fluid (hereinafter 'thermal storage fluid') to be circulated through the solar receiver 110 to store thermal energy therein. The thermal storage fluid may generally be a molten salt, a mixture of Sodium and Potassium Nitrates ($NaNO_3$ and $KNO_3$). However, without departing from the scope of the present disclosure, any other thermal storage fluid as found suitable may be used for the said purpose. The thermal storage arrangement 120 may include first and second storages tanks 122, 124. During day times, when solar energy is incident on the solar receiver 110 by the heliostats, the thermal storage fluid flowing there through is heated. The heated thermal storage fluid may, from the solar receiver 110, be stored in the first storage tank 122. While at nights, the stored heated thermal storage fluid in the first storage thank 122 is utilized to generate electrical power, and resultant cold thermal storage fluid may be stored in the second storage tank 124. Further during times, the cold thermal storage fluid from the second storage tank 124 is supplied the solar receiver 110 to be reheated.

The system 100 includes a multistage steam turbine 130, and primary and secondary steam generator arrangements 140, 150 to utilize heat of the thermal storage fluid of the thermal storage arrangement 120 for driving an electrical generator 150 to produce electrical power. The multistage steam turbine 130 includes a high pressure steam turbine 132, an intermediate pressure turbine 134 and a low pressure turbine 136, which are adapted to be operable on a variable pressure steam generated by the primary and secondary steam generator arrangements 140, 150, by utilizing the thermal storage fluid from the thermal storage arrangement 120.

The primary steam generator arrangement 140 (hereinafter referred to as 'primary arrangement 140') is adapted to receive feed water from a feed water supply 170 via a pump at high pressure. The high pressure feed water is converted into high pressure steam of desired pressure, preferably of 170 bar, and temperature of 545° C., by the thermal storage fluid from the thermal storage arrangement 120. In an example, the primary arrangement 140 includes a high pressure economizer 142, a high pressure evaporator 144 and a superheater 146 communicably configured to utilize the heat of the hot thermal storage fluid received from the first storage tank 122 to generate said high pressure steam. The hot thermal storage fluid results in cold thermal storage fluid upon its heat being utilized by the primary arrangement 140, and the resultant cold thermal energy storage fluid is being directly supplied to the second storage tank 124, from the primary arrangement 140 to be stored therein.

The said high pressure steam is supplied to a high pressure turbine inlet 132a of the high pressure turbine 132 of the multistage steam turbine 130 to drive thereto. After supplying its energy, the steam is released from a turbine stage downstream of a high pressure turbine outlet 132b.

Further, the secondary steam generator arrangement 150 (hereinafter referred to as 'secondary arrangement 150') works simultaneously with the primary arrangement 140. The secondary arrangement 150 is also adapted to receive feed water from the feed water supply 170 via the pump. The secondary arrangement 150 may include a pressure reduction assembly 180 to reduce the pressure of the high pressure heated water supplied from the feed-water supply 170. The heated feed water is then converted into the intermediate pressure steam by the thermal storage fluid from the thermal storage arrangement 120. In an example, the secondary arrangement 150 includes a high pressure economizer 152, a high pressure evaporator 154 and a superheater 156, communicably configured to utilize the heat of the hot thermal storage fluid received from the first storage tank 122 to generate said intermediate pressure steam. The hot thermal storage fluid results in cold thermal storage fluid upon its heat being utilized by the secondary arrangement 150, and the resultant cold thermal energy storage fluid is being directly supplied to the second storage tank 124 from the secondary arrangement 150.

The secondary arrangement 150 includes a reheat assembly 158. The hot thermal storage fluid from the first storage tank 122 is supplied to the secondary arrangement 150, through the reheat assembly 158, to generate said intermediate pressure steam. The intermediate pressure steam generated by the secondary arrangement 150 and the steam that is released from the turbine stage downstream of the high pressure turbine outlet 132b, both, are mixed and supplied to the reheat assembly 158 to be reheated. The mixed and reheated steam is then supplied to an intermediate pressure turbine inlet 134a. Further, the steam from an intermediate pressure turbine outlet 134b is supplied to a low pressure turbine inlet 136a for driving the multistage steam turbine 130. The steam released from a turbine stage downstream of a low pressure turbine outlet 136b may be conditioned in a conditioning arrangement 190.

The conditioning arrangement 190 is configured to condition the steam released from the multistage steam turbine 130, and for doing so, it includes a condenser 192, a low and high pressure heater arrangement 194, 196, and the feedwater supply 170. The condenser 192 is adapted to condense the steam released from the multistage steam turbine 130 to obtain water. Further, the low and high pressure heater arrangements 194, 196 are configured to heat the water received from the condenser 192, as per requirement. Furthermore, the feed-water supply 170, as mentioned above, is configured to supply high pressure feed-water to the primary and secondary arrangements 140, 150.

A system 100 of the present disclosure is advantageous in various scopes. The primary and secondary steam generator arrangements of the solar thermal power system precludes the need of mixing hot molten salt releases from the reheat in order to obtain high pressure or desired pressure live steam to increase overall efficiency of such plant. Such primary and secondary steam generator arrangements may also enable the solar thermal power system to be operable on at least pinch limitation free variable. Further, due to reheating of the steam, by the reheat assembly, which exits from the turbine stage downstream of the high pressure turbine outlet for supplying thereto to the intermediate pressure turbine inlet, precludes wetness problem at an exit of the low pressure steam turbine.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

The invention claimed is:

1. A solar thermal power system, comprising:
    a solar receiver;
    a thermal energy storage arrangement including a thermal energy storage fluid circulated through the solar receiver to store thermal energy in the thermal energy storage fluid, the thermal energy storage arrangement further comprising:
        a first storage tank to store relatively hot thermal energy storage fluid and,
        a second storage tank to store relatively cold thermal energy storage fluid,
    a multistage steam turbine, operable using a variable pressure steam generated by a primary steam generator arrangement using thermal energy stored in the thermal energy storage fluid, for driving an electrical generator to produce electrical power;
    the primary steam generator arrangement supplying a high pressure steam of a desired pressure, produced from the thermal energy stored in the thermal energy storage fluid, to a high pressure turbine inlet of the multistage steam turbine, for steam exit from the multistage steam turbine at a turbine stage downstream of a high pressure turbine outlet;
    a secondary steam generator arrangement having a reheat assembly and operated in parallel with the primary steam generator arrangement, with the secondary steam generator arrangement supplying an intermediate pressure steam, produced from thermal energy stored in the thermal energy storage fluid received from the thermal energy storage arrangement through the reheat assembly of the secondary steam generator, with the intermediate pressure steam and the steam exiting from the turbine stage downstream of the high pressure turbine outlet, both, mixing prior to supply to the reheat assembly for heating and supply to an intermediate pressure turbine inlet of the multistage steam turbine; and
    wherein relatively hot thermal energy storage fluid results in relatively cold thermal energy storage fluid upon use of the thermal energy stored in the relatively hot thermal energy storage fluid in the primary steam generator arrangement to generate the high pressure steam, with the resultant relatively cold thermal energy storage fluid directly supplied to the second storage tank from the primary steam generator arrangement.

2. The solar thermal power system as claimed in claim 1, wherein
    the thermal energy storage arrangement supplies the relatively cold thermal energy storage fluid from the second storage tank to the solar receiver for heating.

3. The solar thermal power system as claimed in claim 1, wherein the primary steam generator arrangement is operable to receive relatively hot thermal energy storage fluid from a first storage tank for use to generate the high pressure steam of the desired pressure for supply to the high pressure turbine inlet of the multistage steam turbine.

4. The solar thermal power system as claimed in claim 1, wherein the secondary steam generator arrangement is operable to receive relatively hot thermal energy storage fluid from the first storage tank through the reheat assembly for use to generate an intermediate pressure steam.

5. The solar thermal power system as claimed in claim 1, wherein relatively hot thermal energy storage fluid results in relatively cold thermal energy storage fluid upon use of the thermal energy stored in the relatively hot thermal energy storage fluid in the secondary steam generator arrangement to generate the intermediate pressure steam, with the resultant relatively cold thermal energy storage fluid directly supplied to the second storage tank from the secondary steam generator arrangement.

6. The solar thermal power system as claimed in claim 1, wherein the primary steam generator arrangement comprises a high pressure economizer, a high pressure evaporator and a superheater communicably configured to utilize the thermal energy stored in the relatively hot thermal energy storage fluid received from the first storage tank to generate the high pressure steam of the desired pressure.

7. The solar thermal power system as claimed in claim 1, wherein the secondary steam generator arrangement comprises an intermediate pressure economizer, an intermediate pressure evaporator and a superheater communicably configured to utilize the thermal energy stored in the relatively hot thermal energy storage fluid received from the first storage tank through the reheat assembly to generate the intermediate pressure steam.

8. The solar thermal power system as claimed in claim 1, wherein the steam from an intermediate pressure turbine outlet is supplied to a low pressure turbine inlet of the multistage steam turbine.

9. The solar thermal power system as claimed in claim 1 further comprising a conditioning arrangement for conditioning the steam exiting from the multistage steam turbine, wherein the conditioning arrangement comprises:
    a condenser to condense the steam exiting from the multistage steam turbine to obtain water;
    low and high pressure heater arrangements configured to heat the water supplied to the low and high pressure heater arrangements by the condenser; and a feed water supply operable to supply high pressure feed-water to the primary and secondary steam generator arrangements.

10. A solar thermal power system, comprising:

a solar receiver;

a thermal energy storage arrangement including a thermal energy storage fluid circulated through the solar receiver to store thermal energy in the thermal energy storage fluid, the thermal energy storage arrangement further including, a first storage tank to store relatively hot thermal energy storage fluid and, a second storage tank to store relatively cold thermal energy storage fluid, for thermal energy storage arrangement supply of the relatively cold thermal energy storage fluid from the second storage tank to the solar receiver for heating;

a multistage steam turbine, operable using variable pressure steams generated using thermal energy stored in the thermal energy storage fluid, for driving an electrical generator to produce electrical power, wherein the multistage steam turbine is operable using variable pressure steams generated by, a primary steam generator arrangement supplied the relatively hot thermal energy storage fluid from the first storage tank for use to generate a high pressure steam of a desired pressure for supply to a high pressure turbine inlet of the multistage steam turbine, for steam exit from a turbine stage downstream of a high pressure turbine outlet;

a secondary steam generator arrangement having a reheat assembly and operated in parallel with the primary steam generator arrangement, with the secondary steam generator arrangement supplied the relatively hot thermal energy storage fluid from the first storage tank through the reheat assembly for use to generate an intermediate pressure steam, the intermediate pressure steam and the steam exiting the turbine stage downstream of the high pressure turbine outlet, both, mixing for supply to the reheat assembly for heating prior to supply to an intermediate pressure turbine inlet of the multistage steam; and wherein relatively hot thermal energy storage fluid results in relatively cold thermal energy storage fluid upon use of the thermal energy stored in the thermal energy storage fluid by the primary steam generator arrangement to generate the high pressure steam, with the resultant relatively cold thermal energy storage fluid directly supplied to the second storage tank from the primary steam generator arrangement.

11. The solar thermal power system as claimed in claim 10, wherein relatively hot thermal energy storage fluid results in relatively cold thermal energy storage fluid upon use of the thermal energy stored in the thermal energy storage fluid by the secondary steam generator arrangement to generate the intermediate pressure steam, with the resultant relatively cold thermal energy storage fluid directly supplied to the second storage tank from the secondary steam generator arrangement.

* * * * *